US011060737B2

(12) United States Patent
Johnson et al.

(10) Patent No.: US 11,060,737 B2
(45) Date of Patent: Jul. 13, 2021

(54) ALTERNATE CONVECTION SYSTEM IN HOME COOKING APPLIANCES

(71) Applicants: BSH Home Appliances Corporation, Irvine, CA (US); BSH Hausgeräte GmbH, Munich (DE)

(72) Inventors: Sean Johnson, New Bern, NC (US); Kenneth Jones, Washington, NC (US); Robert Parchman, Newport, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 308 days.

(21) Appl. No.: 16/212,756

(22) Filed: Dec. 7, 2018

(65) Prior Publication Data

US 2020/0182483 A1   Jun. 11, 2020

(51) Int. Cl.
*F24C 15/32*   (2006.01)
*F24C 3/12*   (2006.01)
*A21B 1/26*   (2006.01)

(52) U.S. Cl.
CPC .............. *F24C 15/322* (2013.01); *A21B 1/26* (2013.01); *F24C 3/128* (2013.01)

(58) Field of Classification Search
CPC ......... F24C 15/332; A21B 1/245; A21B 1/26; A47J 39/003
USPC .................................. 126/21 A, 19 R, 21 R
See application file for complete search history.

(56) References Cited

U.S. PATENT DOCUMENTS

| 2,308,332 | A | | 1/1943 | Irwin et al. | |
|---|---|---|---|---|---|
| 3,507,265 | A | | 4/1970 | Hurko et al. | |
| 3,590,801 | A | * | 7/1971 | Long | F24C 14/00 |
| | | | | | 126/19 R |
| 5,203,315 | A | * | 4/1993 | Clawson | F24C 3/087 |
| | | | | | 126/19 R |
| 5,228,385 | A | | 7/1993 | Friedrich et al. | |
| 5,813,393 | A | | 9/1998 | Persson et al. | |
| 6,870,136 | B1 | | 3/2005 | Majordy | |
| 2015/0047623 | A1 | * | 2/2015 | Wiggins | F24C 15/08 |
| | | | | | 126/19 R |

FOREIGN PATENT DOCUMENTS

| CN | 105010445 A | 11/2015 |
|---|---|---|
| JP | 2000104924 A | 4/2000 |
| JP | 2002267162 A | 9/2002 |

* cited by examiner

*Primary Examiner* — Vivek K Shirsat
(74) *Attorney, Agent, or Firm* — Michael E. Tschupp; Andre Pallapies; Brandon G. Braun (57) ABSTRACT

A convection system in a home cooking appliance, including: an oven cavity defined by a top wall, a bottom wall, a pair of opposed side walls, a rear wall, and a front opening closable by an oven door; at least one heating source configured to heat the oven cavity; and a convection air channel that passes along the top wall of the oven cavity and then down along the rear wall of the oven cavity, the convection air channel having at least one inlet in the top wall of the oven cavity, at least one outlet configured to communicate with the oven cavity, and a fan disposed within the convection air channel at a location outside of the oven cavity. The convection air channel is devoid of an additional heating source that is separate from and in addition to the at least one heating source.

19 Claims, 9 Drawing Sheets

ALTERNATE CONVECTION SYSTEM IN HOME COOKING APPLIANCES

FIELD OF THE INVENTION

The present disclosure relates to home cooking appliances and, more particularly, to an alternate convection system in home cooking appliances.

BACKGROUND OF THE INVENTION

In general, a convection oven refers to a gas or electric oven equipped with a fan that circulates and intensifies the heat, thereby decreasing the normal cooking time. The "convection" in convection ovens refers to heating via air. Thus, as noted above, a convection oven still uses the traditional heating methods (e.g., electric resistance heating element), but also adds an airflow cycle that blows hot air across the cooking dish and vents it back out again. Accordingly, this means that the food is being cooked by both radiant heat from the heating element and heated air passing over the food. This not only speeds up the cooking process, but also serves to cook more evenly without the usual hot spots with traditional ovens.

Typically, conventional convection cooking systems pull the air from the center rear of the oven cooking cavity and then disperse the air radially from this position back into the oven cooking cavity. A fan is positioned at the middle of the rear wall with an inlet opening into the oven cavity for drawing the air from the oven cavity. A dedicated heating element is disposed around the fan for heating the air as it is discharged radially from the fan. The fan and fan motor cause the fan unit to protrude into the oven cavity albeit covered with a cover or false wall. Also, the conventional convection cooking systems are energy inefficient due to the need for the dedicated convection heating element around the fan.

SUMMARY OF THE INVENTION

An apparatus consistent with the present disclosure is directed to improving the overall performance and energy efficiency of a convection system in a home cooking appliance.

An apparatus consistent with the present disclosure is directed to a convection system in a home cooking appliance where the heated air for convection cooking that is normally trapped at a top portion of the oven cooking cavity is drawn into a ducting system and is channeled from the top portion of the oven cooking cavity downward and the same heated air is then reintroduced into the oven cooking cavity with velocity and vectors which aids in cooking. This channeling of the heated air that is normally trapped at the top portion of the oven cooking cavity is done without the use of traditional convection methods which require an additional dedicated heating element in the convection flow path usually proximate the fan.

An apparatus consistent with the present disclosure can utilize a fan to move the heated air that is normally trapped at a top portion of the oven cooking cavity through the ducting system and introduce the same heated air back into the oven cooking cavity at lower points.

An apparatus consistent with the present disclosure can integrate the ducting system into the structural walls of the oven cooking cavity.

According to one aspect, the present disclosure provides a convection system in a home cooking appliance, including: an oven cavity defined by a top wall, a bottom wall, a pair of opposed side walls, a rear wall, and a front opening closable by an oven door; at least one heating source configured to heat the oven cavity; a convection air channel that passes along the top wall of the oven cavity and then down along the rear wall of the oven cavity, the convection air channel having at least one inlet in the top wall of the oven cavity, at least one outlet configured to communicate with the oven cavity, and a fan disposed within the convection air channel at a location outside of the oven cavity, such that hot air from the oven cavity is drawn into the convection air channel through the at least one inlet by the fan, flows down along the rear wall of the oven cavity, through the at least one outlet, and back into the oven cavity. The convection air channel is devoid of an additional heating source that is separate from and in addition to the at least one heating source.

According to another aspect, at least a portion of the convection air channel is formed by the top wall of the oven cavity.

According to another aspect, an exterior of the top wall of the oven cavity is formed with an inwardly recessed portion that tapers from a wide position proximate to the front opening of the oven cavity rearward to a narrower position proximate to the rear wall of the oven cavity, and wherein the inwardly recessed portion is covered by a convection channel cover to form a top wall convection channel portion of the convection air channel that passes along the top wall of the oven cavity.

According to another aspect, the at least one heating source comprises a bake electric heating element disposed under the bottom wall of the oven cavity.

According to another aspect, the at least one heating source comprises the bake electric heating element and a broil electric heating element.

According to another aspect, the top wall of the oven cavity comprises a broil shield, and the broil electric heating element is disposed in the oven cavity below the broil shield.

According to another aspect, the at least one inlet of the convection air channel comprises a plurality of elongated inlet vent slots formed in the broil shield.

According to another aspect, the plurality of elongated inlet vent slots are spaced along an inwardly protruding portion of the broil shield that protrudes into the oven cavity at a location adjacent to the front opening of the oven cavity.

According to another aspect, the at least one heating source comprises a gas bake burner disposed in a burner box located under the bottom wall of the oven cavity.

According to another aspect, the at least one heating source comprises the gas bake burner and a gas broil burner.

According to another aspect, at least a portion of the convection air channel is formed by the rear wall of the oven cavity.

According to another aspect, an interior of the rear wall of the oven cavity is formed with an outwardly recessed portion, and wherein the outwardly recessed portion is covered by a convection baffle to form a rear wall convection channel portion of the convection air channel that passes along the rear wall of the oven cavity.

According to another aspect, the at least one outlet of the convection air channel comprises a plurality of outlet ports formed in the convection baffle.

According to another aspect, the convection baffle extends from the bottom wall of the oven cavity up to a location below the top wall of the oven cavity, and wherein the plurality of outlet ports comprise a plurality of columns and rows of outlet ports formed in the convection baffle.

According to another aspect, at least upper rows of the plurality of outlet ports include flanges on the outlet ports, where the flanges are configured to direct the hot air towards the front opening of the oven cavity.

According to another aspect, in a middle column of the plurality of outlet ports, the middle column outlet ports are elongated slots disposed horizontally, and in outer columns of the plurality of outlet ports, the outer column outlet ports are elongated slots disposed at an angle with respect to horizontal.

According to another aspect, the convection air channel comprises a top wall convection channel portion, a rear wall convection channel portion, and a fan housing in which the fan is disposed and which is configured to join together the top wall convection channel portion and the a rear wall convection channel portion.

According to another aspect, the fan housing and the fan are disposed in a top rear area outside of the oven cavity.

According to another aspect, the fan comprises a radial fan having elongated, axially extending blades.

According to another aspect, the present disclosure provides a home cooking appliance, comprising: an oven cavity defined by a top wall, a bottom wall, a pair of opposed side walls, a rear wall, and a front opening closable by an oven door; at least one heating source configured to heat the oven cavity; and a convection air channel that passes along the top wall of the oven cavity and then down along the rear wall of the oven cavity, the convection air channel having at least one inlet in the top wall of the oven cavity, at least one outlet configured to communicate with the oven cavity, and a fan disposed within the convection air channel at a location outside of the oven cavity, such that hot air from the oven cavity is drawn into the convection air channel through the at least one inlet by the fan, flows down along the rear wall of the oven cavity, through the at least one outlet, and back into the oven cavity, wherein the convection air channel is devoid of an additional heating source that is separate from and in addition to the at least one heating source.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE EXEMPLARY EMBODIMENTS

The exemplary embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Moreover, it should be understood that terms such as top, bottom, front, rear, rearward, upper, lower, upward, downward, and the like used herein are for orientation purposes with respect to the drawings when describing the exemplary embodiments and should not limit the present invention unless explicitly indicated otherwise in the claims. Also, terms such as substantially, approximately, and about are intended to allow for variances to account for manufacturing tolerances, measurement tolerances, or variations from ideal values that would be accepted by those skilled in the art.

Figure 1:
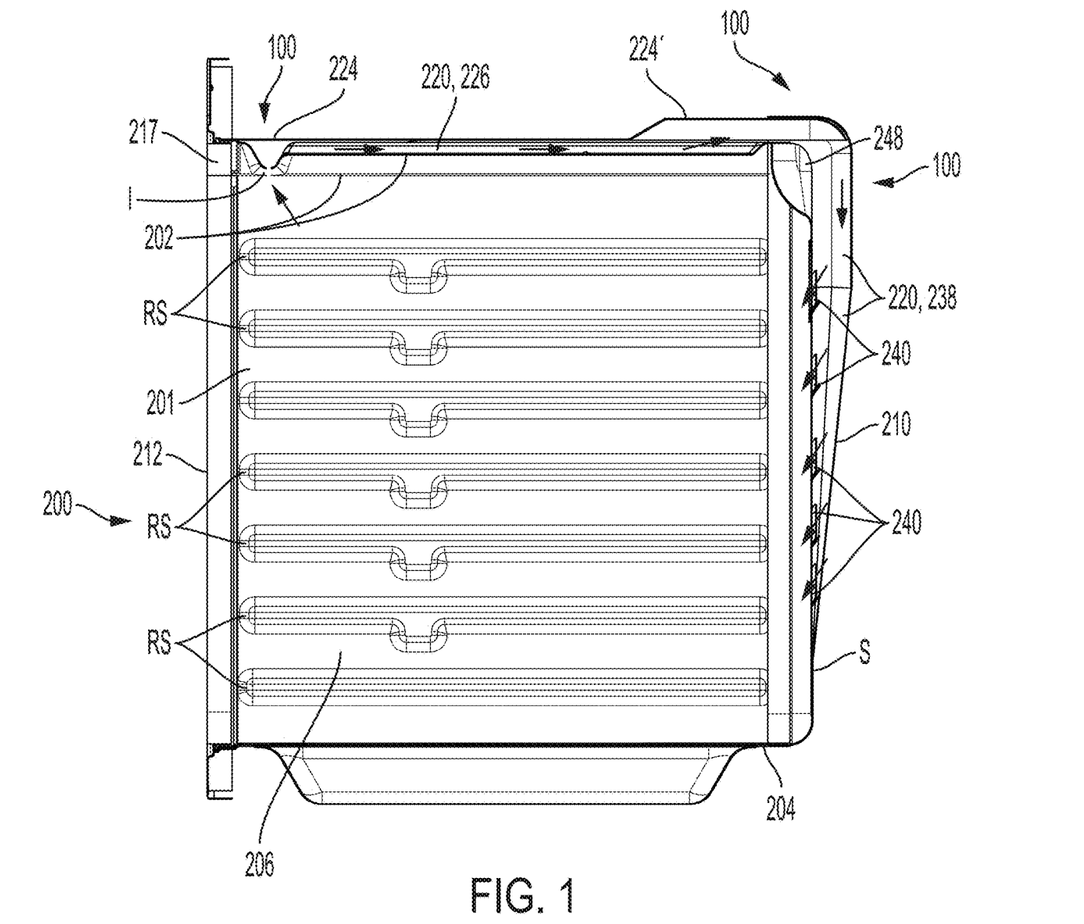
FIG. 1 illustrates a cut-away side view of a convection system in a home cooking appliance according to an exemplary embodiment consistent with present disclosure.

FIG. 1 illustrates a cut-away side view of a convection system 100 in a home cooking appliance or oven 200 according to an exemplary embodiment consistent with present disclosure.

Figure 2:
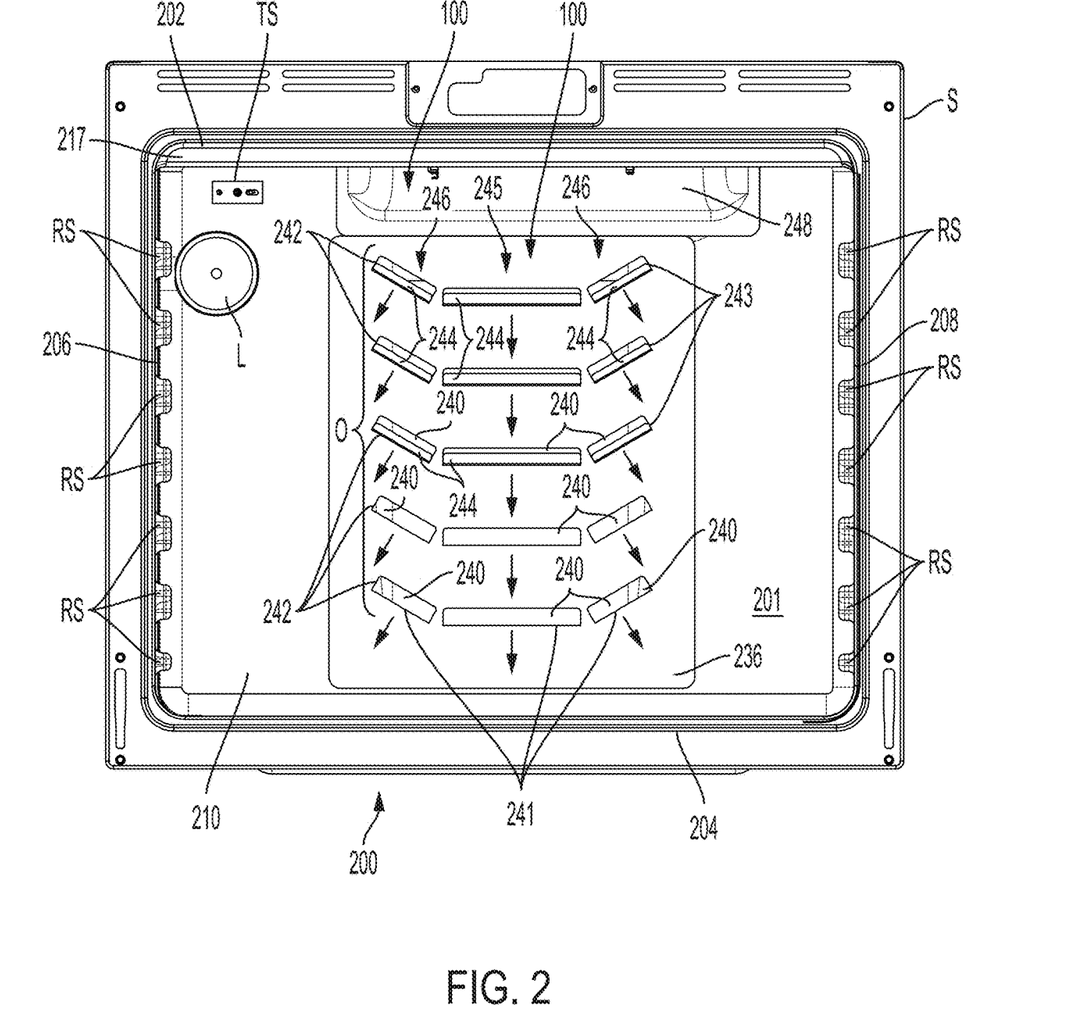
FIG. 2 is a front view of the convection system through a front opening closable by an oven door according to an exemplary embodiment consistent with present disclosure.
Figure 3:
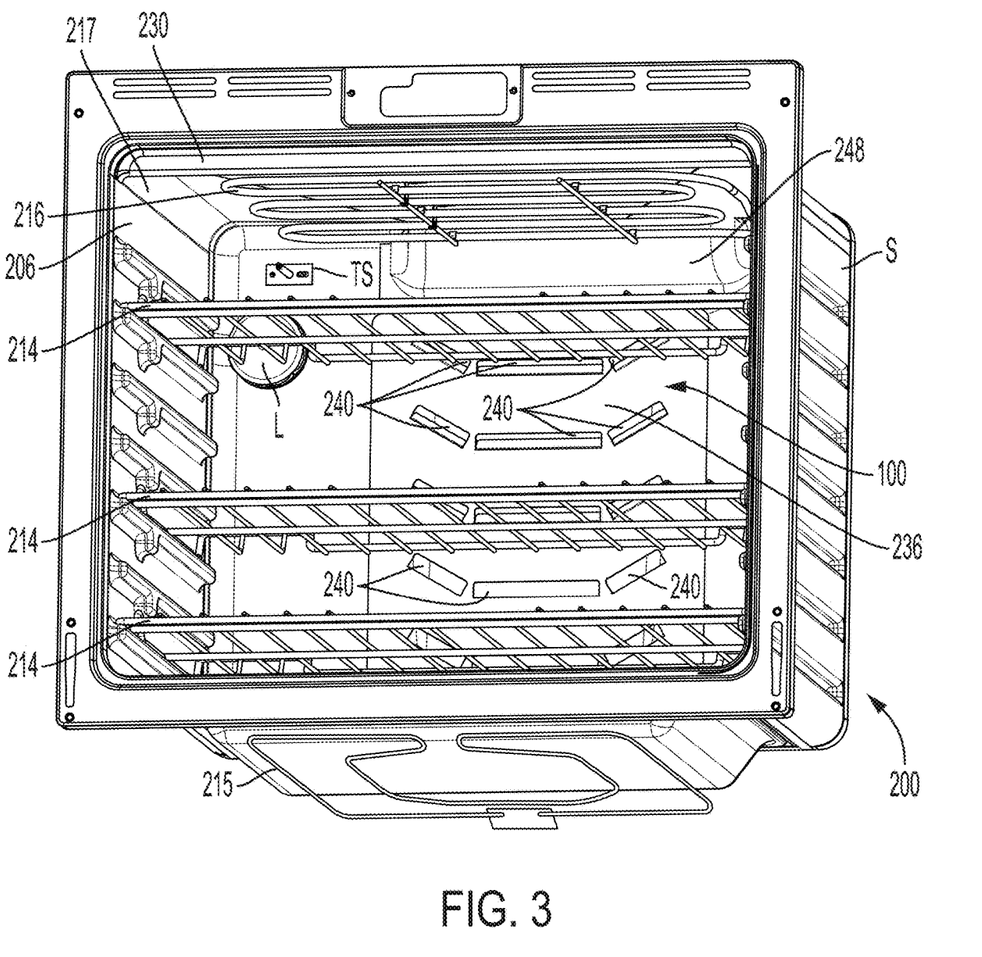
FIG. 3 is a perspective view from the bottom, front, and one side of the oven cavity showing the electric heating elements and cooking racks in place according to an exemplary embodiment consistent with present disclosure.
Figure 4:
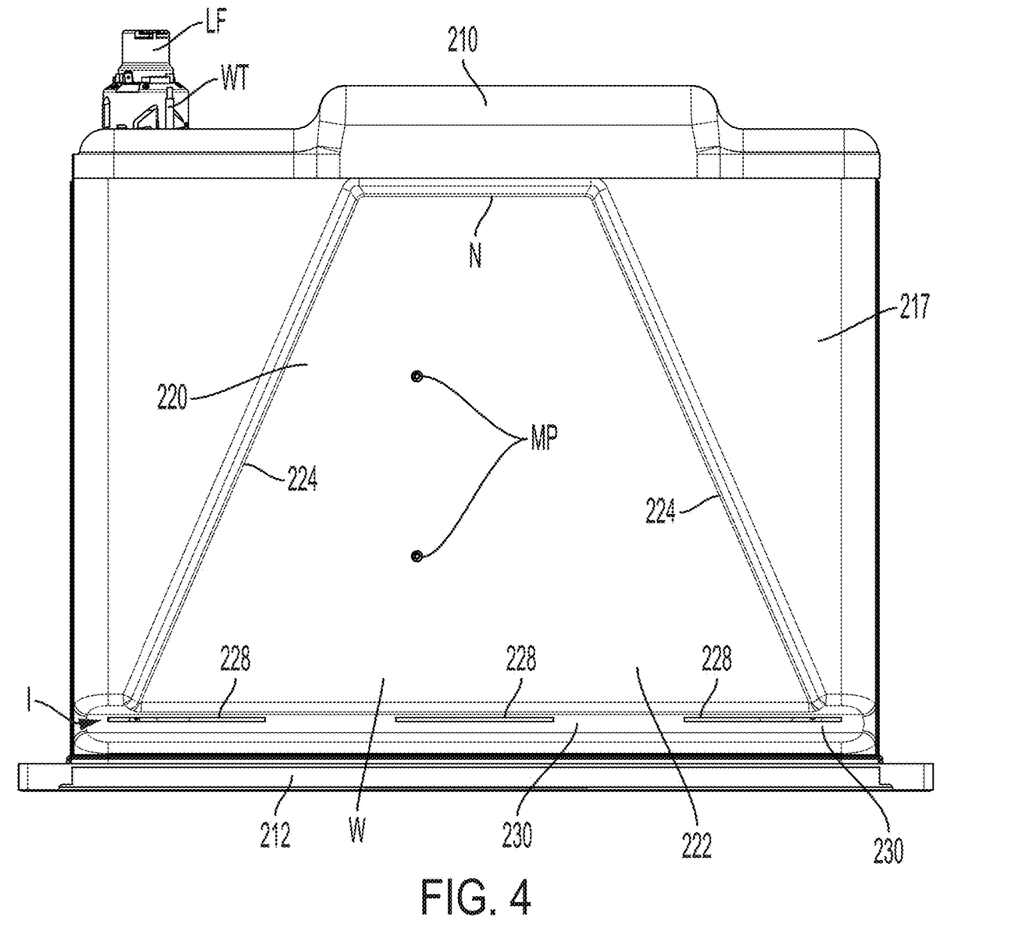
FIG. 4 is a top view of the oven cavity with the convection channel cover removed to reveal the top wall convection channel portion of the convection air channel according to an exemplary embodiment consistent with present disclosure.
Figure 8:
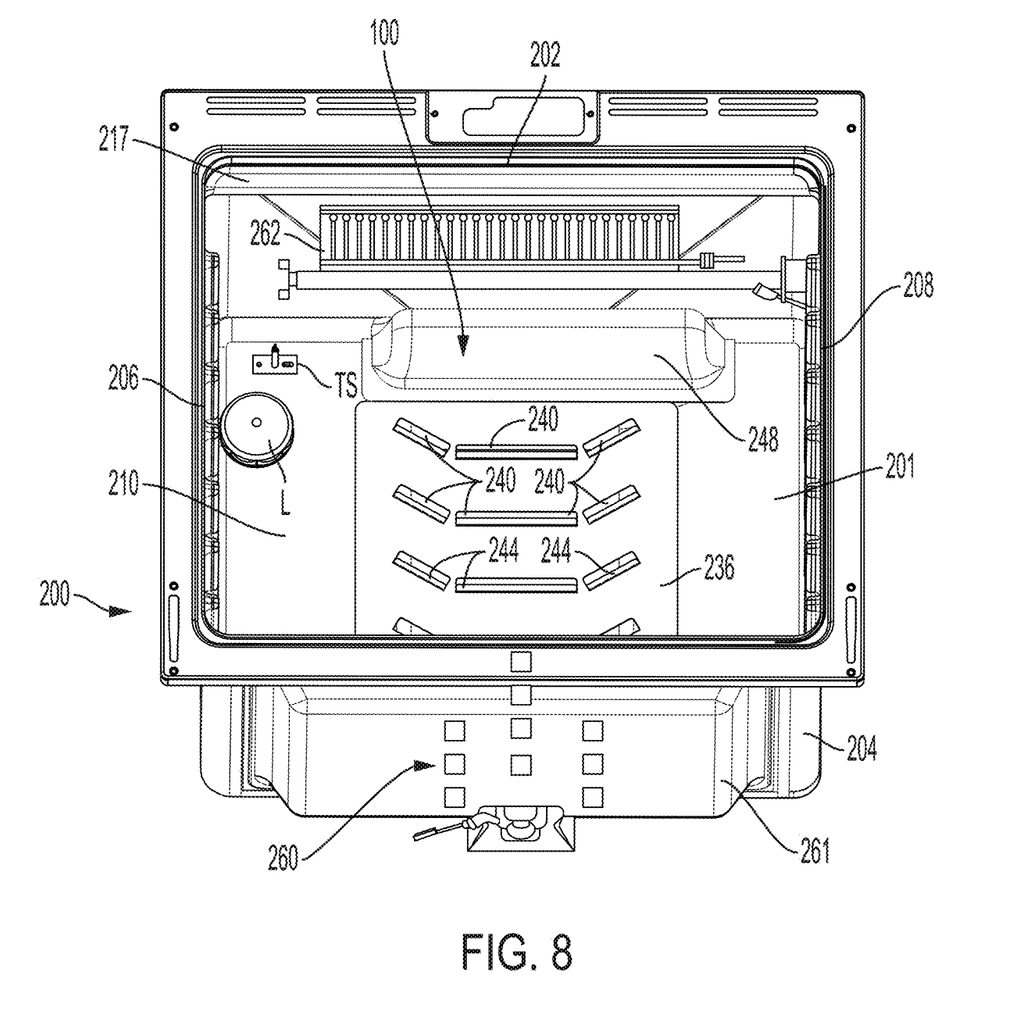
FIG. 8 is a perspective view from the bottom and front of the oven cavity showing the gas burners in place according to an alternative exemplary embodiment consistent with present disclosure.
Figure 9:
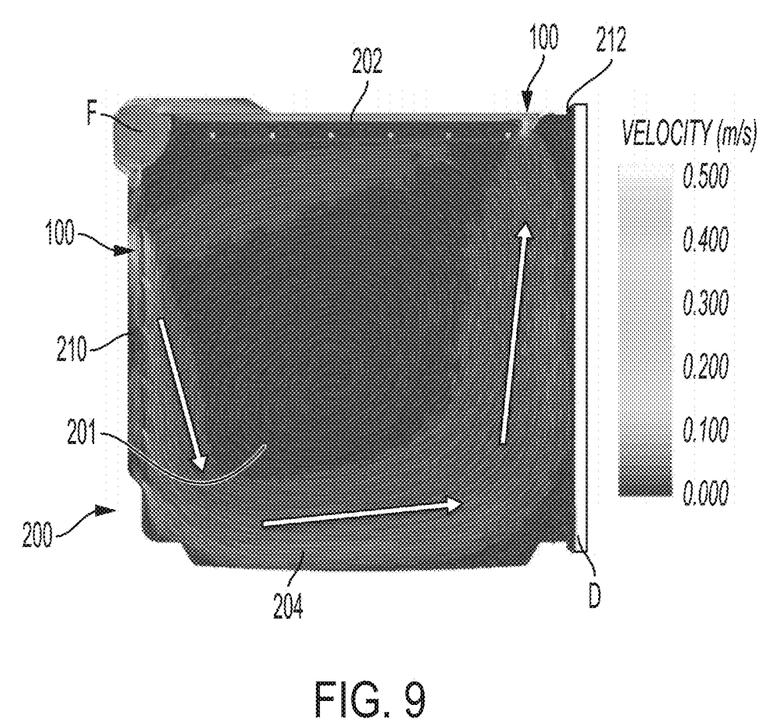
FIG. 9 is a side cut-away view showing a simulation of the convection system according to an exemplary embodiment consistent with present disclosure.

With reference to FIG. 1 and the front view of FIG. 2, the home cooking appliance 200 includes an oven cavity 201 defined by a top wall 202, a bottom wall 204, a pair of opposed side walls 206, 208, a rear wall 210, and a front opening 212 closable by an oven door D (see FIG. 9). The various walls of the oven cavity 201 form a shell S which can be, for example, stamped from sheet metal or the like. The shell S is covered or wrapped in insulation (not shown) around the top wall 202, the bottom wall 204, the pair of opposed side walls 206, 208, and the rear wall 210 and the insulated shell is disposed in an exterior aesthetic housing (not shown) of a free standing oven range. The insulation and the exterior aesthetic housing have been dispensed with for ease of understanding the convection system 100. A number of rack supports RS are shown on the two side walls 206 and 208. While seven pairs of rack supports RS are shown on each side for different heights to adjust the distance of the cooking racks from the heating sources, the number is not limited to seven and can be modified as needed. The rack supports RS can be, for example, stamped in when the shell S is formed. As shown in FIG. 3, three cooking racks 214 are shown in the oven cavity 201 at various heights. Also visible in FIGS. 2, 3, 5, and 8 are an oven light L and a temperature sensor TS. With reference to FIGS. 4 and 6, a light fixture LF for the oven light L protrudes from the rear wall 210 and wiring WT serving as a connection for the temperature sensor TS also exits out of the rear wall 210.

As shown in FIG. 3, at least one heating source comprises a bake electric heating element 215 disposed under the bottom wall 204 of the oven cavity 201. As is typical with a home cooking appliance, the at least one heating source also includes a broil electric heating element 216. The bake electric heating element 215 and the broil electric heating element 216 can be, for example, electric resistance heating elements. As shown in FIGS. 1 and 2, the top wall 202 of the oven cavity 201 comprises a broil shield 217, and the broil electric heating element 216 is disposed in the oven cavity 201 below the broil shield 217. As shown in FIG. 4, two mounting points MP for the broil electric heating element 216, which is disposed in the oven cavity 201, are visible on an exterior of the broil shield 217.

With reference to especially FIGS. 1, 2, and 4-6, in general terms, a convection air channel 220 passes along the top wall 202 of the oven cavity 201 and then down along the rear wall 210 of the oven cavity 201. As will be discussed in more detail below, the convection air channel 220 has at least one inlet I in the top wall 202 of the oven cavity 201, at least one outlet O configured to direct the hot air back into the oven cavity 201, and a fan F disposed within the convection air channel 220 at a location outside of the oven cavity 201, such that hot air from the oven cavity 201 is drawn into the convection air channel 220 through the at least one inlet I by the fan F, passes or flows down along the rear wall 210 of the oven cavity 201, through the at least one outlet O, and back into the oven cavity 201. The convection air channel 220 is devoid of an additional heating source that is separate from and in addition to the at least one heating source (e.g., the bake electric heating element 215 and the broil electric heating element 216).

As best shown in FIGS. 1, 4, and 6, at least a portion of the convection air channel 220 is formed by the top wall 202 of the oven cavity 201. In particular, an exterior of the top wall 202 of the oven cavity 201 is formed with an inwardly recessed portion 222 that tapers as at 224 from a wide position W proximate to the front opening 212 of the oven cavity 201 rearward to a narrower position N proximate to the rear wall 210 of the oven cavity 201 (see FIG. 4). The inwardly recessed portion 222 is covered by a convection channel cover 224 (see FIG. 6) to form a top wall convection channel portion 226 (see FIG. 1) of the convection air channel 220 that passes along the top wall 202 of the oven cavity 201.

With reference to FIGS. 1 and 4, the at least one inlet I of the convection air channel 220 comprises a plurality of elongated inlet vent slots 228 formed in the broil shield 217. In this case, the top wall 202 of the oven cavity 201 comprises the broil shield 217, and the broil electric heating element 216 is disposed in the oven cavity 201 below the broil shield 217. In this regard, note that because of the presence of the broil shield 217, the convection air channel 220 is out of the direct effects of the broil electric heating element 216. The plurality of elongated inlet vent slots 228 are spaced along an inwardly protruding portion 230 of the broil shield 217 that protrudes into the oven cavity 201 at a location adjacent to the front opening 212 of the oven cavity 201. As shown in FIGS. 1 and 6, a rear portion of the convection channel cover 224 is slightly raised in a region 224' proximate to the fan F and fan housing 248 where the top wall convection channel portion 226 is directed upwardly before entering into the fan housing 248.

Figure 5:
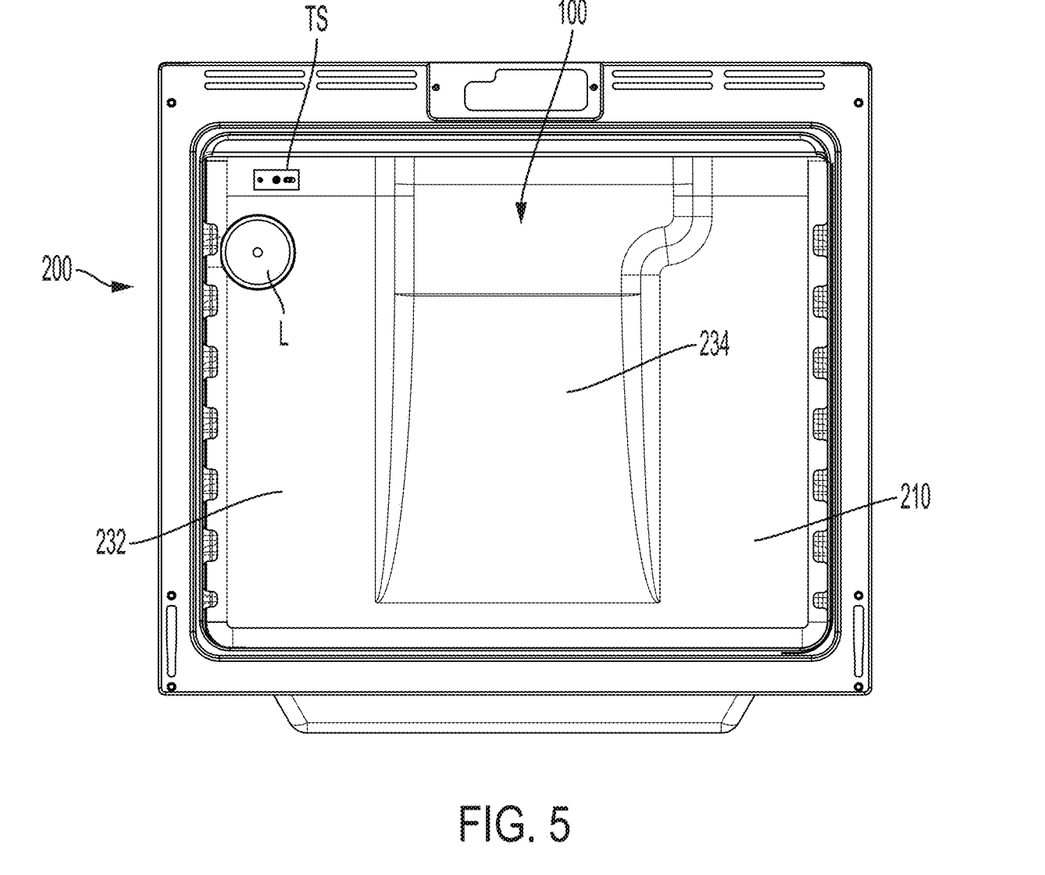
FIG. 5 is a front view of the convection system similar to FIG. 2, but with the convection baffle, the fan housing, and the fan removed to reveal the rear wall of the oven cavity according to an exemplary embodiment consistent with present disclosure.
Figure 6:
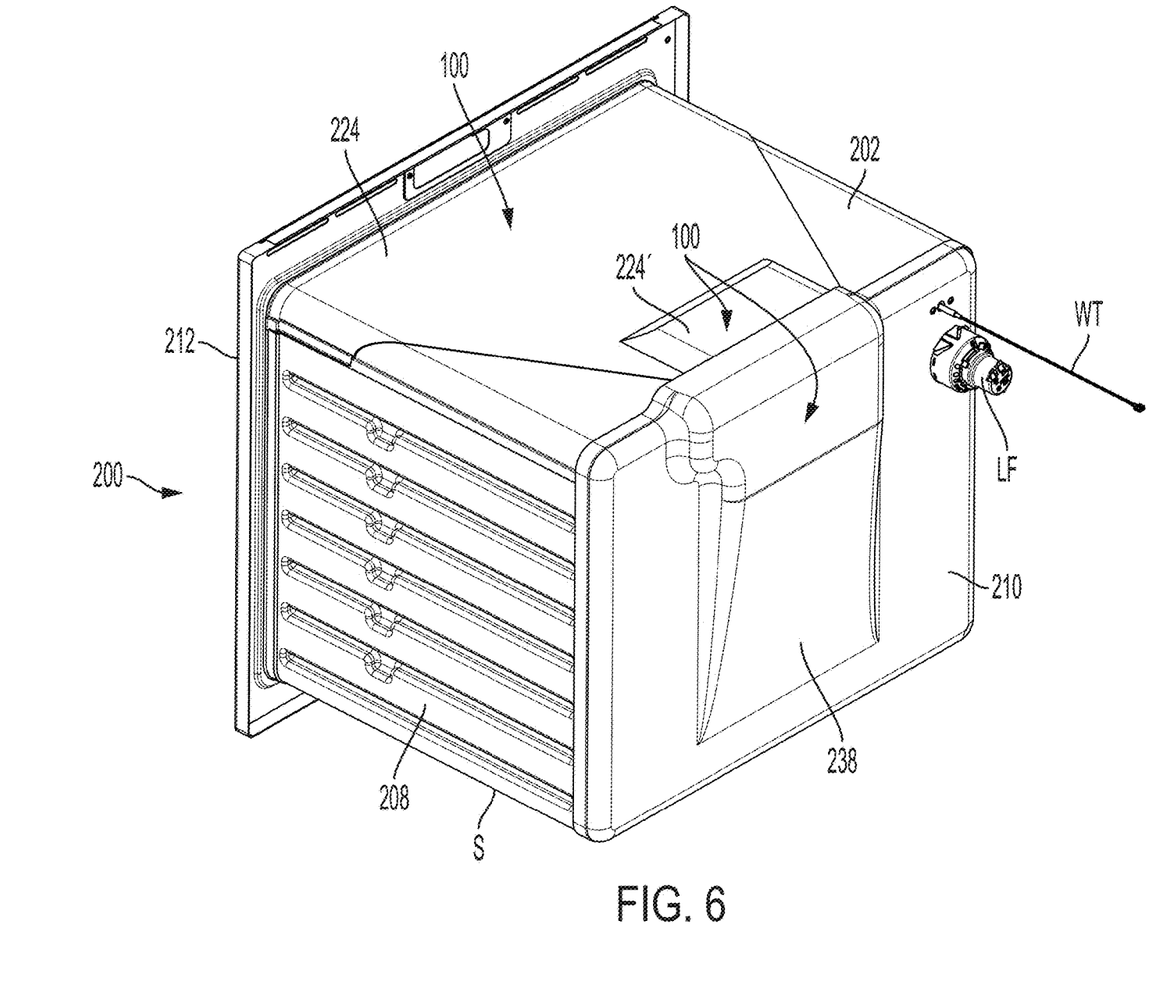
FIG. 6 is a perspective view from the top, rear, and one side of the oven cavity according to an exemplary embodiment consistent with present disclosure.

As best shown in FIGS. 1-3, 5, and 6, at least a portion of the convection air channel 220 is formed by the rear wall 210 of the oven cavity 201. As shown in FIGS. 5 and 6, an interior 232 of the rear wall 210 of the oven cavity 201 is formed with an outwardly recessed portion 234. The outwardly recessed portion 234 is covered by a convection baffle 236 to form a rear wall convection channel portion 238 of the convection air channel 220 that communicates with the fan housing 248 and passes along the rear wall 210 of the oven cavity 201 (see FIGS. 1 and 2). The at least one outlet O of the convection air channel 220 comprises a plurality of outlet ports 240 formed in the convection baffle 236. As best shown in FIG. 2, the convection baffle 236 extends from the bottom wall 204 of the oven cavity 201 up to a location below the top wall 202 of the oven cavity 201 and below an exterior of the fan housing 248 in the oven cavity 201, and wherein the plurality of outlet ports 240 comprise a plurality of columns 241 and rows 242 of outlet ports 240 formed in the convection baffle 236. In this case, at least upper rows 243 of the plurality of outlet ports 240 include flanges 244 on the outlet ports 240, where the flanges 244 are configured to direct the hot air flow towards the front opening 212 of the oven cavity 201. In a middle column 245 of the plurality of outlet ports 240, the middle column outlet ports are elongated slots disposed horizontally, and wherein in outer columns 246 of the plurality of outlet ports, the outer column outlet ports are elongated slots disposed at an angle with respect to horizontal (see FIG. 2).

Figure 7:
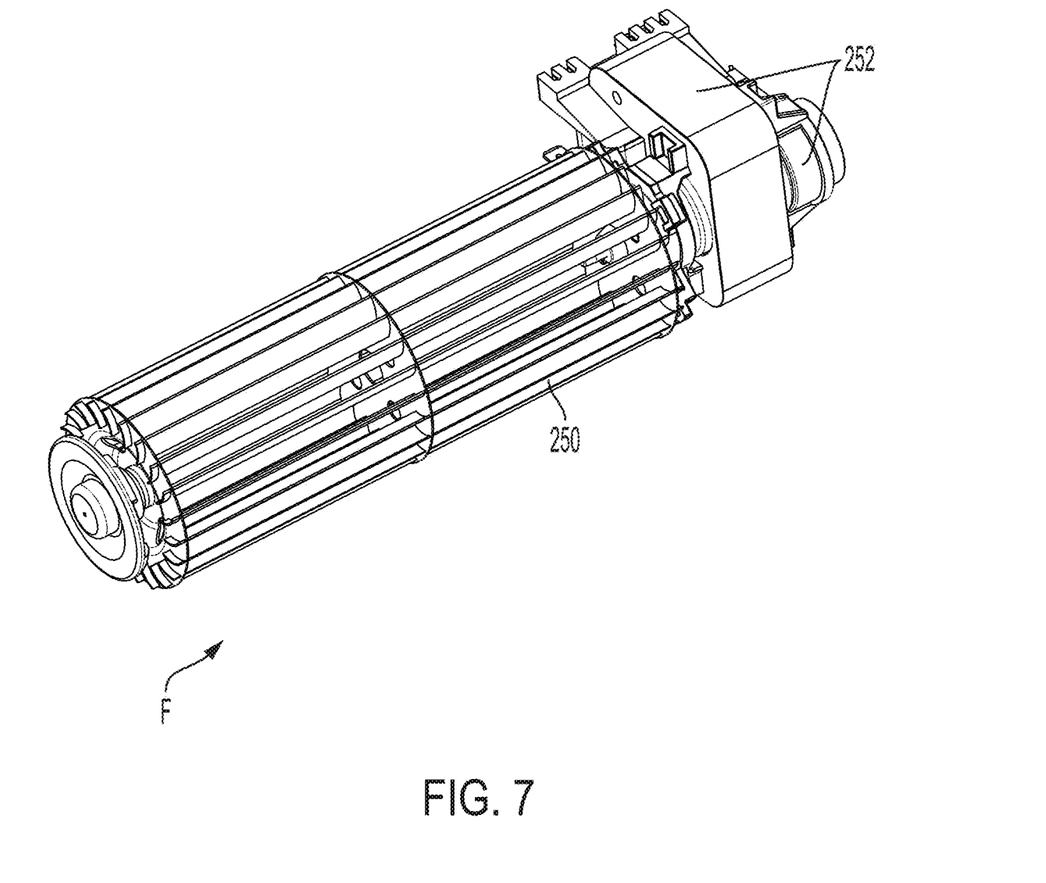
FIG. 7 is a perspective view of an exemplary fan for the convection system according to an exemplary embodiment consistent with present disclosure.

Based on the foregoing, the convection air channel 220 comprises the top wall convection channel portion 226, the rear wall convection channel portion 238, and the fan housing 248 in which the fan F (see FIGS. 1 and 7) is disposed and which is configured to join together the top wall convection channel portion 226 and the a rear wall convection channel portion 238. As shown in FIG. 1-3, the fan housing 248 and the fan F are disposed in a top rear area outside of the oven cavity 201. As shown in FIG. 7, the fan F comprises, for example but not limited to, a radial fan having elongated, axially extending blades or paddles 250 and an electric drive motor 252.

FIG. 8 is a perspective view from the bottom and front of the oven cavity showing the gas burners in place according to an alternative exemplary embodiment consistent with present disclosure. Like elements are denoted by like references numerals/characters. The gas bake burner 260 is used in place of the bake electric heating element 215 and is positioned in a burner box 261 below the bottom wall 204 of the oven cavity 201. The gas broil burner 262 is used in place of the broil electric heating element 216 and is disposed in the oven cavity 201 below the broil shield 217.

In operation, the heated air for convection cooking that is normally trapped at a top portion of the oven cooking cavity 201 is drawn into the convection air channel 220 through the elongated inlet vent slots 228 of the inlet I and through the top wall convection channel portion 226 by the fan F, flows down along the rear wall 210 of the oven cavity 201 through the rear wall convection channel portion 238, through the outlet ports 240 of the outlet O in the convection baffle 236, and the heated air is then reintroduced back into the oven cavity 201 with velocity and vectors as directed by the flanges 244 which aids in cooking. This channeling of the heated air that is normally trapped at the top portion of the oven cooking cavity is done without the use of traditional convection methods which require an additional dedicated heating element in the convection flow path usually proximate the fan, thereby improving the overall performance and energy efficiency of the convection system in a home cooking appliance. The channeling of the heated air further has the combined beneficial effects of reducing outer oven cavity wall temperatures while causing the desired heated vortex of air used for convection cooking.

By pulling the hottest air from the top of the oven cavity 201 and reintroducing this heated air back into the oven cavity at lower points, the heat loss from fluing and wall temperatures will be reduced by means of convection cooling. The convection cooling of the metal further heats the air eliminating the need for an additional heating element on or near the fan.

FIG. 9 is a side cut-away view showing a simulation of the convection system according to an exemplary embodiment consistent with present disclosure. As can be seen from FIG. 9, the hot air for cooking/baking inside the oven cavity 201 moves in a low velocity vortex, "rolling" into the center of the oven cavity 201 (the velocity is shown in meters per second). This rolling movement helps to create the ideal convection cooking environment of low speed and constant temperature.

The present invention has substantial opportunity for variation without departing from the spirit or scope of the present invention. For example, while the convection system in a home cooking appliance of the present disclosure is described in connection with a free standing oven range, the present invention is equally applicable to built-in oven units.

Those skilled in the art will recognize improvements and modifications to the exemplary embodiments of the present invention. All such improvements and modifications are considered within the scope of the concepts disclosed herein and the claims that follow.

What is claimed is:

1. A convection system in a home cooking appliance, comprising:
   an oven cavity defined by a top wall, a bottom wall, a pair of opposed side walls, a rear wall, and a front opening closable by an oven door;
   at least one heating source configured to heat the oven cavity; and
   a convection air channel that passes along the top wall of the oven cavity and then down along the rear wall of the oven cavity, the convection air channel having at least one inlet in the top wall of the oven cavity, a plurality of outlet ports configured to communicate with the oven cavity, and a fan disposed within the convection air channel at a location outside of the oven cavity, such that hot air from the oven cavity is drawn into the convection air channel through the at least one inlet by the fan, flows down along the rear wall of the oven cavity, through the plurality of outlet ports, and back into the oven cavity,
   wherein the convection air channel is devoid of an additional heating source that is separate from and in addition to the at least one heating source, and
   wherein the plurality of outlet ports comprise a plurality of columns and rows of outlet ports and at least an upper row of the plurality of outlet ports include flanges on the outlet ports, the flanges being configured to direct the hot air towards the front opening of the oven cavity.

2. The convection system in a home cooking appliance of claim 1, wherein at least a portion of the convection air channel is formed by the top wall of the oven cavity.

3. The convection system in a home cooking appliance of claim 2, wherein an exterior of the top wall of the oven cavity is formed with an inwardly recessed portion that tapers from a wide position proximate to the front opening of the oven cavity rearward to a narrower position proximate to the rear wall of the oven cavity, and wherein the inwardly recessed portion is covered by a convection channel cover to form a top wall convection channel portion of the convection air channel that passes along the top wall of the oven cavity.

4. The convection system in a home cooking appliance of claim 1, wherein the at least one heating source comprises a bake electric heating element disposed under the bottom wall of the oven cavity.

5. The convection system in a home cooking appliance of claim 4, wherein the at least one heating source comprises the bake electric heating element and a broil electric heating element.

6. The convection system in a home cooking appliance of claim 5, wherein the top wall of the oven cavity comprises a broil shield, and the broil electric heating element is disposed in the oven cavity below the broil shield.

7. The convection system in a home cooking appliance of claim 6, wherein the at least one inlet of the convection air channel comprises a plurality of elongated inlet vent slots formed in the broil shield.

8. The convection system in a home cooking appliance of claim 7, wherein the plurality of elongated inlet vent slots are spaced along an inwardly protruding portion of the broil shield that protrudes into the oven cavity at a location adjacent to the front opening of the oven cavity.

9. The convection system in a home cooking appliance of claim 1, wherein the at least one heating source comprises a gas bake burner disposed in a burner box located under the bottom wall of the oven cavity.

10. The convection system in a home cooking appliance of claim 9, wherein the at least one heating source comprises the gas bake burner and a gas broil burner.

11. The convection system in a home cooking appliance of claim 1, wherein at least a portion of the convection air channel is formed by the rear wall of the oven cavity.

12. The convection system in a home cooking appliance of claim 11, wherein an interior of the rear wall of the oven cavity is formed with an outwardly recessed portion, and wherein the outwardly recessed portion is covered by a convection baffle to form a rear wall convection channel portion of the convection air channel that passes along the rear wall of the oven cavity.

13. The convection system in a home cooking appliance of claim 12, wherein the plurality of outlet ports are formed in the convection baffle.

14. The convection system in a home cooking appliance of claim 13, wherein the convection baffle extends from the bottom wall of the oven cavity up to a location below the top wall of the oven cavity.

15. The convection system in a home cooking appliance of claim 14, wherein in a middle column of the plurality of outlet ports, the middle column outlet ports are elongated slots disposed horizontally, and wherein in outer columns of the plurality of outlet ports, the outer column outlet ports are elongated slots disposed at an angle with respect to horizontal.

16. The convection system in a home cooking appliance of claim 1, wherein the convection air channel comprises a top wall convection channel portion, a rear wall convection channel portion, and a fan housing in which the fan is disposed and which is configured to join together the top wall convection channel portion and the a rear wall convection channel portion.

17. The convection system in a home cooking appliance of claim 16, wherein the fan housing and the fan are disposed in a top rear area outside of the oven cavity.

18. The convection system in a home cooking appliance of claim 1, wherein the fan comprises a radial fan having elongated, axially extending blades.

19. A home cooking appliance, comprising:
- an oven cavity defined by a top wall, the top wall comprising a broil shield, a bottom wall, a pair of opposed side walls, a rear wall, and a front opening closable by an oven door;
- a bake electric heating element disposed under the bottom wall of the oven cavity;
- a broil electric heating element disposed below the broil shield; and
- a convection air channel that passes along the top wall of the oven cavity and then down along the rear wall of the oven cavity, the convection air channel having at least one inlet in the top wall of the oven cavity, at least one outlet configured to communicate with the oven cavity, and a fan disposed within the convection air channel at a location outside of the oven cavity, such that hot air from the oven cavity is drawn into the convection air channel through the at least one inlet by the fan, flows down along the rear wall of the oven cavity, through the at least one outlet, and back into the oven cavity,
- wherein the convection air channel is devoid of an additional heating source that is separate from and in addition to the bake electric heating element and the broil electric heating element, and
- wherein the at least one inlet of the convection air channel comprises a plurality of elongated inlet vent slots formed in the broil shield.

* * * * *